July 15, 1969  J. REEKIE  3,455,221
IMAGE STABILIZATION
Filed May 17, 1965  3 Sheets-Sheet 1
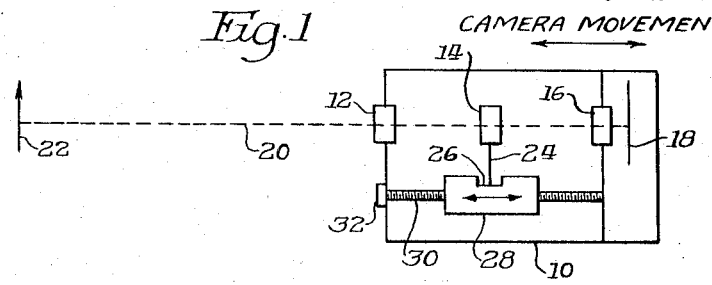
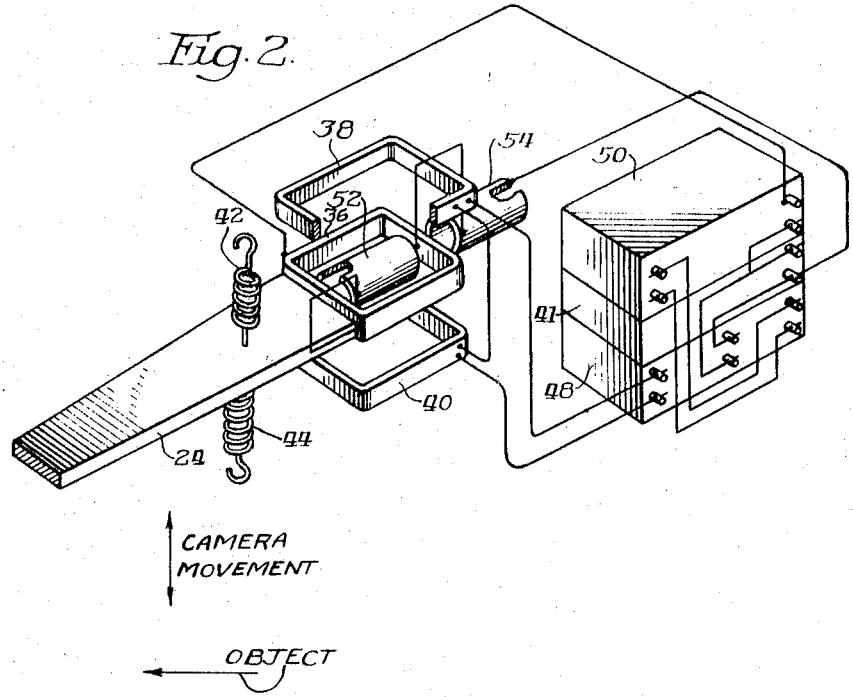
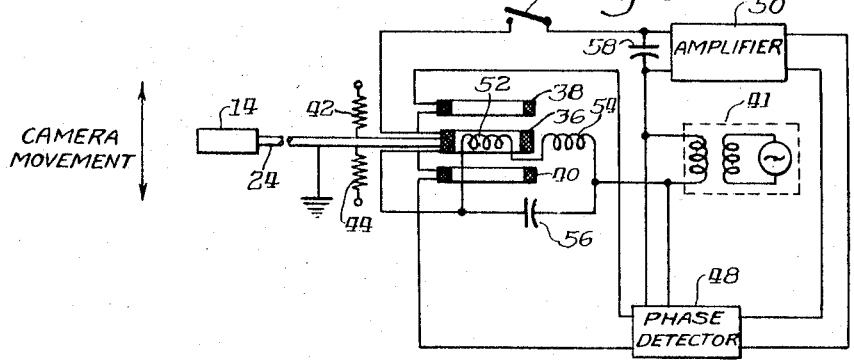
Inventor:
James Reekie.
By Griffin and Stokes
Attys July 15, 1969   J. REEKIE   3,455,221
IMAGE STABILIZATION
Filed May 17, 1965   3 Sheets-Sheet 2

Inventor:
James Reekie.
By Griffin and Stokes
Attys

Inventor:
James Reekie.
Griffin and Stokes
Attys

By

United States Patent Office 3,455,221
Patented July 15, 1969

3,455,221
IMAGE STABILIZATION
James Reekie, Wilmette, Ill., assignor to Bell & Howell Company, Chicago, Ill., a corporation of Illinois
Filed May 17, 1965, Ser. No. 456,202
Int. Cl. G03b 29/00
U.S. Cl. 95—12.5                                    18 Claims

ABSTRACT OF THE DISCLOSURE

This disclosure describes an apparatus for preventing or minimizing change of image characteristics due to the inadvertent movement of an optical system. One or more components of a multicomponent optical system are maintained substantially stationary in space during movement of other optical system components through the use of a modified force balance transducer. The force balance transducer is modified so that it carries on its moving coil one or more elements of the optical system with the remaining elements of the optical system attached to the fixed coils of the transducer.

---

The present invention relates to novel means for preventing or minimizing change of image characteristics due to inadvertent movement of an optical system, such as in a camera, and more particularly relates to apparatus for maintaining one or more optical components of a multicomponent optical system substantially stationary in space during movement of other optical system components through use of a modified force balance transducer or similar circuit.

Stabilizing systems in general normally depend upon gyroscopic inertia effects or seismic mass effects. Both systems have been widely used to maintain stable a platform in order to define fixed directions in space, and for many other purposes. In application to stabilized optics, gyroscopes have been used to maintain whole optical systems, or components of optical systems, in fixed orientation so that images formed by the system remain stationary in the system focal plane.

The present invention relates to a different kind of stabilizing system which employs electrical sensing means rather than the inertia effect of a gyroscope. It preferably employs a circuit commonly known as a force balance transducer which is modified so as to carry on its moving coil one or more elements of an optical system or the like, with the remaining elements in the optical system being attached to the transducer fixed coils. This achieves a degree of optical stabilization for certain motions of the system in the directions to which the transducer is sensitive or responsive.

Therefore, one object of the present invention is to provide electrical circuit means for achieving stabilization in space of one or more elements or components of an optical system subject to movement.

Another object of the present invention is to provide an optical stabilization system or the like utilizing a force balance transducer circuit modified so as to maintain its moving coil substantially fixed in space for movement of its fixed coils.

A further object of the present invention is to provide an optical stabilizing system wherein a modified force balance transducer circuit is arranged to be sensitive to rectilinear movement along or transverse to the optical axis.

Still another object of the present invention is to provide an optical stabilizing system wherein a modified force balance transducer circuit is sensitive to angular movement.

These and other objects of the present invention will become apparent during the course of the following description to be read in view of the drawings; in which:

FIG. 1 is a diagrammatic view of the invention as used for stabilizing a system subject to movement along an optical axis;

FIGS. 2 and 3 show one form of force balance transducer circuit usable in the system of FIG. 1;

Figure 4A:
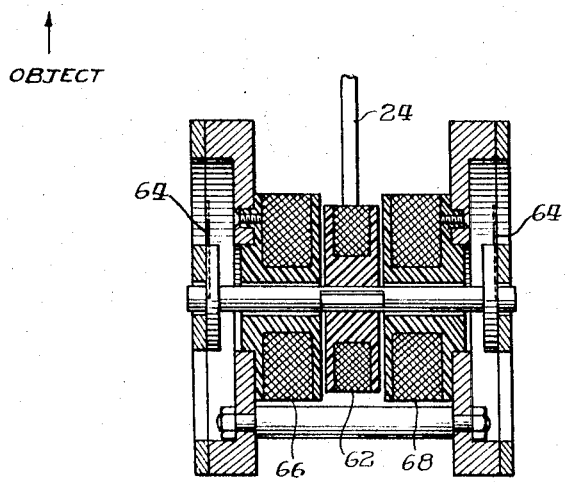
Figure 4B:
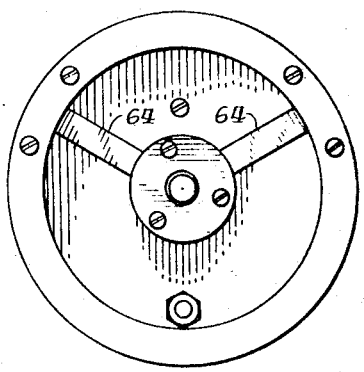
Figure 5:
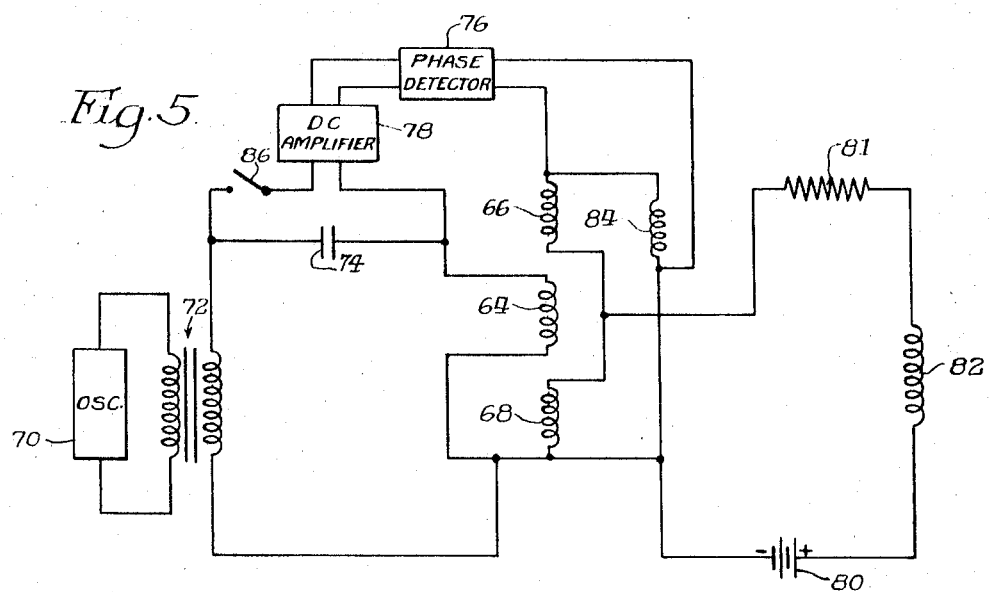
Figure 6:
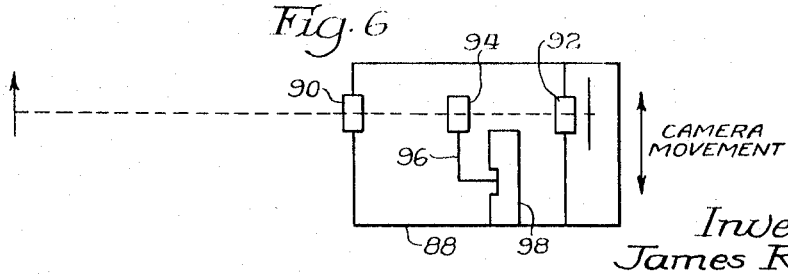
Figure 7A:
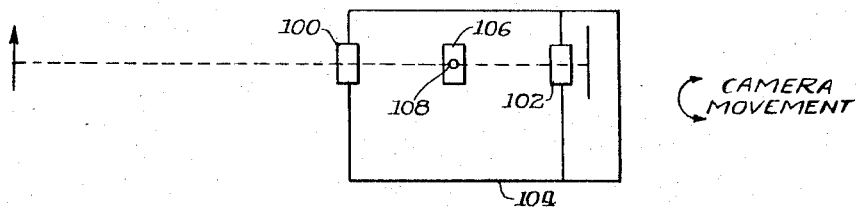
Figure 7B:
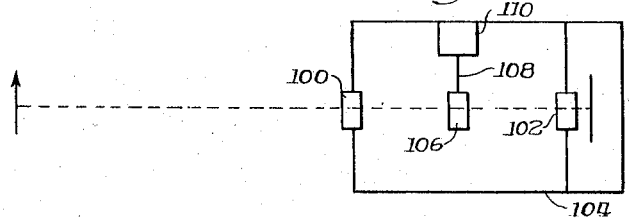
Figure 8:
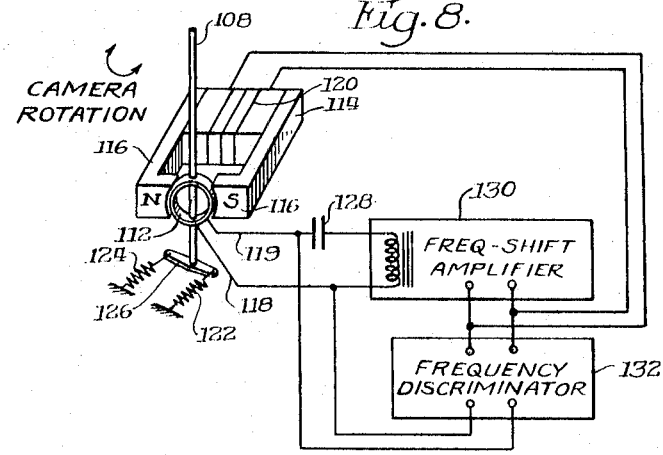
Figure 9:
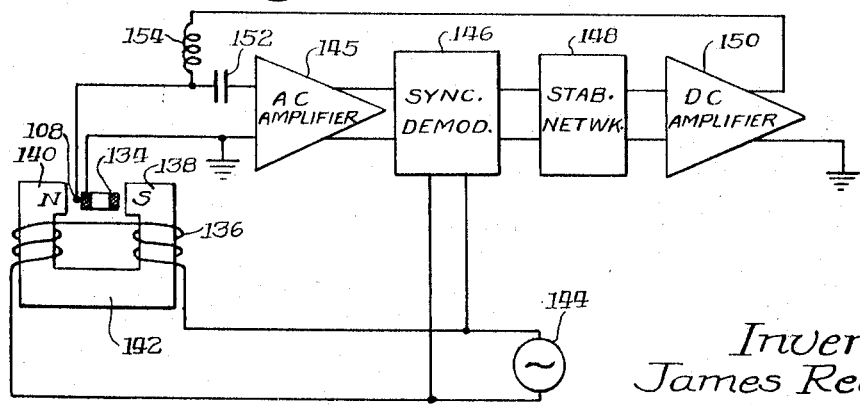

FIGS. 4A, 4B, and 5 show features of a different force balance transducer circuit usable in the system of FIG. 1;

FIG. 6 is a diagrammatic view showing the invention as used to stabilize a system subject to movement transverse to the optical axis;

FIGS. 7A and 7B are diagrammatic views showing the invention as used to stabilize an optical system for rotatable or angular motion;

FIG. 8 is a circuit schematic showing a force balance transducer circuit usable in the invention of FIGS. 7A and 7B; and FIG. 9 illustrates a different type of force balance transducer circuit adaptable for use in FIGS. 7A and 7B.

FIG. 1 is a diagrammatic view showing the invention for stabilizing an optical system wherein minute motions of the camera to and from the object do not cause the image at the focal plane to become out of focus. Generally, the camera housing 10 contains a multielement lens, typically comprised of components 12, 14, and 16. One of these components, e.g., 14, is internally movable in relation to the others. The whole lens system is situated in front of the film gate 18 at the focal plane. Both lens components 12 and 16 are thus fixed relative to camera housing 10 and film gate 18, whereas component 14 is movable along the optical axis 18 to adjust for various distances between camera housing 10 and the object to be photographed at point 22. Component 14 is held by a bracket arm 24 which in turn emerges from a slot 26 in a movable carrier frame 28 which for convenience sake, is shown to be mounted upon a screw 30. When camera housing 10 is deliberately moved forward or away from object 22, as for close ups or distance shots, spindle 30 is rotated, either manually by the operator by knob 32, or by automatic focusing mechanism, not shown, so as to move carriage 28 in order to obtain a clear image at film gate 18. This may be accomplished by other known zoom or focusing methods. Generally, lens system 12, 14, and 16 is such that a shortening of the distance between camera and object requires that component 14 be moved away from component 12 and toward component 16 in order to maintain image clarity, and vice versa when camera housing 10 is moved away from the object. Other typical zoom lens systems as used in movie or still cameras could also be used. Once the carriage 28 has been moved, it remains fixed so that component 14 generally is fixed along the optical axis at the proper point. However, there may still be slight changes of spacing between the camera housing and object 22 due to the involuntary shaking of the operator's hands occurring at frequencies up to 10 or 20 cycles per second in a direction along the optical axis or due to the vibration of the camera mount caused by other factors. Consequently, the coarse focusing means as represented by spindle 30, is not sensitive nor rapid enough to compensate for the slight variations in longitudinal motion, such that there will be a tendency for the image at film gate 18 to blur. However, stabilizer carriage 28 carries internal electrical circuitry whereby arm 24 can move relative to carriage 28 along the length of slot 26 in order to maintain lens component 14 fixed or substantially fixed in space even though housing 10 moves slightly to or from its desired ideal or mean position in space. For example, if the operator involuntarily moves housing 10 slightly toward object 22, lens arm 24 maintains a fixed spatial position even though stabilizer carriage 28 moves with camera housing 10. Thus, with lens component 14 so remaining stationary in space, the distance between it and component 12 increases whereas the distance decreases between component 14 and component 16 so as to maintain a sharp image at film gate 18 even though the distance between component 12 and object 22 has been slightly shortened. On the other hand, if camera housing 10 is involuntarily moved slightly away from object 22, the relative motion between arm 24 and stabilizer 28 so as to maintain component 14 in a fixed spatial position, causes automatic compensation for the increase in distance between component 12 and object 22 in order to maintain a sharply defined image.

While particular details of the electrical circuits in stabilizing carriage 28 can vary in order to provide the desired function, one novel aspect of the invention involves the modification of any well-known force balance transducer circuit in order to effectively and simply accomplish the stabilization of lens component 14 in space. One such force balance transducer is shown in FIGS. 2 and 3, and, except for the modifications hereafter described, is virtually identical to the circuit shown in U.S. Patent 2,942,187 which may be consulted for further details. In general, and as best shown in FIG. 2, lens component 14 in FIG. 1 is carried by arm 24. A coil 36 is rigidly fixed to the other end of arm 24, with said coil 36 being part of a linear differential transducer. Coils 38 and 40 are positioned at opposite sides of movable coil 36 and are fixed in position with respect to carriage 28. Coils 38 and 40 are also inductively related with coil 36. Coil 36 is applied with an A.C. current from a high frequency oscillator 41, so that A.C. flux links coils 38 and 40 and generates opposite polarity voltages thereacross. The amplitude of the sum of the voltages across coils 38 and 40 will vary with the position of coil 36 with respect to coils 38 and 40. When coil 36 is equally spaced from coils 38 and 40, at some center location fixed with respect to coils 38 and 40 and thus with respect to lens components 12, 16, the voltages across the latter two coils will be equal and out of phase and therefore at zero. When coil 36 moves to one side of the normal center position, closer to one of coils 38 and 40 than to the other, the closer coil 38 or 40 will pick up more voltage than the farther coil 28 or 40, and the sum of the two voltages will no longer be zero. The magnitude of the sum of the voltages across coils 38 and 40 will be indicative of the amount of displacement of the farther coil from coil 36, and the polarity of the voltage will be indicative of the direction of the displacement. In the absence of any forces acting upon arm 24, said arm ins maintained in its normal center location by force biasing means such as a pair of tension coiled springs 42 and 44 connected to arm 24. The other ends of springs 42 and 44 are made fast to the inside of stabilizing carriage 28.

The phase of the sum of voltages across coils 38 and 40 is detected by phase detector 48 to whose input the series combination of coils 38 and 40 is connected. Phase detector also receives a standard A.C. voltage from the high frequency oscillator 41. The phase detector 48 provides an output voltage which is D.C. in nature and has an amplitude determined by the difference in amplitude between the voltages across coils 38 and 40 and a polarity determined by the phase relationship of this difference voltage with the output of oscillator 41.

The output of phase detector is amplified by a D.C. amplifier 50 whose output in turn is connected to one side of movable coil 36. The other side of the movable coil is connected to one side of a fixed coil including a pair of windings 52 and 54. The other side of the fixed coil is connected to the high frequency oscillator so that the series circuit including coil 36 and windings 52 and 54 is provided with composite voltage including an A.C. component from oscillator 41 and a D.C. component from amplifier 50. The A.C. component of the composite voltage is bypassed around coils 52 and 54 by a capacitor 56 so that only coil 36 is fed the A.C. signal. Both moving coil 36 and the split coils 52 and 54 receive the D.C. component of the composite voltage. The A.C. current in coil 36 is provided for the position transducing function of the coil. The D.C. component of current, however, is provided to furnish an electrical force urging arm 24 away from its normal center position and thus against the net bias force provided by spring 42 and 44. This urging force is between the fixed windings 52 and 54 and the movable coil 36. Winding 52 is mounted within coil 36, while winding 54 is mounted externally thereof. Nevertheless, both windings are in inductive relationship with movable coil 36. The D.C. amplifier 50 is bypassed for A.C. by a capacitor 58.

The circuit of FIG. 2 and FIG. 3 operates as follows. When the operator of the camera deliberately desires to change the distance between housing 10 and object 22, he first opens a switch 60 so as to prevent D.C. current flow through coil 36 and windings 52 and 54. Consequently, arm 24 is stabilized and maintained at its normal center location by virtue of springs 42 and 44. The operator then rotates screw 30, or otherwise operates the main focusing system, so as to shift stabilizing carriage 28 along the optical axis in order to bring lens component 14 to a position whereby a clear image is produced at the film gate. When once this carriage position has been reached, the operator may then close switch 60 and commence to take the picture. As long as arm 24 remains in its center location, there is no error signal voltage difference generated across coils 38 and 40. Consequently, there is no current flow from amplifier 50 which would tend to set up a magnetic force opposing the spring bias. However, any inadvertent motion of camera housing 10 in either a direction toward or away from object 22 causes arm 24 to be moved away from its center location. This is because the inertia of lens component 14 and also the inertia of that portion of arm 24 to which it is connected, initially causes component 14 to remain fixed in space upon initial movement of housing 10. For example, assume that there is a slight movement of camera housing 10 toward object 22 of a distance of one unit. In FIG. 3, this means that fixed coils 38 and 40 move downward in the direction of the object such that the gap between coil 38 and coil 36 shortens by said one unit of movement while the gap between coil 36 and 40 increases by said one unit. The induced voltage in coil 38 therefore increases, whereas that in coil 40 decreases, so as to generate an error difference voltage whose amplitude is indicative of the degree of movement made by camera housing 10 and whose phase is indicative of the movement direction. This error voltage difference is sensed by a phase detector which thereupon causes amplifier 50 to produce a direct current whose magnitude is proportional to the error voltage and whose sign is governed by the phase of the error voltage.

At the time that camera housing 10 is moved toward object 22, it further moves springs 42 and 44 downward so as to decrease the tension in spring 42 while increasing the tension in spring 44. Thus, an unbalanced mechanical force, proportional to the displacement of camera housing 10, is set up and applied to arm 24. This mechanical force attempts to thereafter move arm 24 downward so as to recenter said arm equally between coils 38 and 40. However, the D.C. current from amplifier 50 is of a magnitude and sign such as to set up an upward, counter balancing magnetic force by virtue of coils 36, 52, and 54, so as to equal and oppose the downward mechanical spring unbalanced force. Consequently, even though camera housing 10 has thus moved slightly toward object 22 from the position desired by the operator, arm 24 and lens component 14 remain fixed or substantially fixed in space, even though coil 36 is away from its center position, by virtue of the net zero force applied. Any further movement (within limits) of camera housing 10 toward object 22 further decreases the space between coil 36 and coil 38 and likewise increases the spring force acting on arm 24. However, the D.C. signal from amplifier 50 will be likewise increased so as to counterbalance the increased spring force and thus hold arm 24 in a stabilized position in space.

Movement of camera housing 10 away from object 22 and from its desired spatial position causes an opposite result. That is to say, upward movement of springs 42 and 44 causes a mechanical upward force which if uncompensated, would tend to move arm 24 also upward. However, because of the mass inertia of lens component 14 and arm 24, there is initially a change in spacing between coil 36 and coils 38, 40 such that amplifier 50 generates a D.C. signal of magnitude and sign equally opposing the upward mechanical force in order to maintain arm 24 in a stabilized position in space and away from its center location between coils 38 and 40. Thus, it will be seen that a typical force balanced transducer circuit has been modified so as to provide positive signal feedback tending to keep the mechanical element away from its normal center location and acting against a biasing force tending to maintain the element at its center location.

To illustrate that the force balance transducer of FIGS. 2 and 3 is but one of many available circuits for such modification, FIGS. 4A, 4B, and 5 illustrate another form of force balance transducer suitable for use within stabilizing carriage 28 of FIG. 1. The circuit next to be described is generally that disclosed in a research paper entitled "A Force-Displacement Indicator for a Drag Balance," by R. E. Franklin of Oxford University Engineering Laboratory, published by the Aeronautical Research Council of the British Ministry of Aviation and a copy of which may be found in the Langley Research Center Library at Langley Field, Va. FIGS. 4A and 4B show different diagrammatic views of the mechanical structure of the transducer, while FIG. 5 shows a circuit diagram thereof. In general, a movable inner coil 62 is supported by spring members 64 for longitudinal motion along the optical axis between two outer fixed coils 66 and 68. Any movement of inner coil 62 from a center position or location, wherein it is spaced equally from coil 66 and 68, is opposed by the mechanical force set up by springs 64, with said unbalanced mechanical force being proportional to the degree of displacement of coil 62 from the center position. Thus, movement of camera housing 10 and stabilizing carriage 28 toward an object 22 initially causes the gap between coil 62 and 68 to become smaller because of the inertia of coil 62. A mechanical force is set up by said action which, if not opposed, would return coil 62 to its center location between coil 66 and 68. However, electrical offcenter detecting means permits generation of an opposing magnetic field force between coil 62 and coils 66, 68 which opposes any spring force so as to keep coil 62 in its offcenter position and thus stabilized in space.

Circuit details of this transducer are shown in FIG. 5. Center coil 64 is supplied with an A.C. voltage from oscillator 70 via a coupling transformer 72 and a bypass capacitor 74 in order to induce voltages in the two outer fixed coils 66 and 68. When coil 64 is exactly midway therebetween, the induced voltages in coils 66 and 68 are equal in magnitude and are of opposite polarity so as to cancel each other. A phase detector 76 measures the sum of the voltages across windings 66 and 68. If coil 64 moves closer to one of the fixed coils than to the other, induced voltage in one fixed coil increases whereas the induced voltage in the other fixed coil decreases so as to generate an error signal difference sensed by phase detector 76. The output from phase detector 76 causes the D.C. amplifier 78 to produce a D.C. current in center winding 64 which has a polarity and is of a magnitude sufficient to interact with a D.C. field in windings 66 and 68 and maintain coil 64 in its offcenter location against the mechanical spring force attempting to return same to its center location. D.C. current in winding 66 and 68 is produced by a battery 80, and is maintained at constant magnitude. Inductance 82 prevents induced A.C. current from flowing in windings 66 and 68 which might upset the force balancing mechanism, and the same purpose is provided by inductance 84. Consequently, it is seen that the force balance transducer of FIG. 5 differs from that in FIG. 3 because in the former the magnetic force generating elements are identical to the differential transformer sensing elements 66, 64, and 68. However, it will further be appreciated that the force balance transducer described in the above-identified British research paper has been modified to cause positive feedback from amplifier 78 rather than negative feedback, and that springs 64 must be capable of applying a mechanical restoring force in order to prevent oscillation of the system. The switch 86 is provided to disable the D.C. current line whenever the operator of the camera desires to deliberately change the distance between the camera and the object.

Stabilizing carriage 28 in FIG. 1 has so far been described as oriented such that inadvertent motion of the camera to or away from object 22 maintains a sharp image at the film gate. A lens system compensating for motion transverse to the optical axis, rather than along it, is shown in FIG. 6. A camera housing 88 contains a lens system comprised of fixed optical elements 90 and 92 and a movable lens element 94 connected to arm 96 which is movable in a direction at right angles to the optical axis so as to move transversely relative to components 90 and 92. Thus, an image, which would normally move downward or upward on the film plate as a result of undesired transverse down or up motion of camera housing 88, now remains stationary for said housing movement about a mean spatial position or location of the camera. This is accomplished by maintaining lens component 94 stabilized in space such that it moves upward relative to components 90, 92 for downward motion of camera housing 88, and moves downward relative to components 90, 92 for camera housing movement in an upward direction. This stabilization in space of component 94 is accomplished through use of a circuit such as in FIG. 3 or FIG. 5, or any other force balance transducer circuit capable of modification, which is contained in a stabilizer carriage 98 affixed to the inside of camera housing 88. Furthermore, arm 96 may further be attached to a second stabilizing circuit responsive to camera motion along the optical axis, i.e., at right angles to that shown in FIG. 6, which in turn would support the optical component 94 in the manner shown by carrier 28 and arm 24 in FIG. 1. By further attaching carriage 98 in FIG. 6 to a third arm coming from a third stabilizing circuit sensitive to camera motion at right angles to the plane of the figure, a complex system can be devised to give a stationary image despite rectilinear motion of the camera housing 88 in any direction for small excursions about a mean camera position in space.

The above applications shown in FIGS. 1 and 6 have all been applied to rectilinear motion either along the optical axis or transverse thereto. Inasmuch as an optical system may also undergo rotational motion about one or more axes, the same principles can be applied to achieve stabilization of one optical element of a lens system to maintain it in a fixed orientation in space so as to prevent image jitter or blurring. Such configuration is shown in FIGS. 7A and 7B which are respectively side and plan views of a simple camera. A lens containing optical elements 100 and 102 is fixed in a camera housing 104 which may be subjected to slight angular motions about a horizontal axis, i.e., normal to the plane of FIG. 7A. In order to prevent the image on the film from changing position when said inadvertent rotation occurs, a movable optical lens element 106 is provided as part of the lens system which is supported by a shaft or arm 108 extending from a stabilizing mechanism 110 affixed to the camera housing. The stabilizing circuits 110 act to maintain arm 108 and lens element 106 in a fixed orientation notwithstanding rotation of housing 104. Thus, if in FIG. 7A camera housing 104 is rotated slightly counterclockwise of its horizontal direction, such that lens component 100 moves downward and lens element 102 moves upward, stabilizing means 110 acts to keep element 106 in its indicated true horizontal position so as to maintain the position of the image on the film.

As in the case of FIGS. 1 and 6, details of stabilizing circuit 110 are not restricted to one particular configuration, but may be any one of several well known angular force balance transducer mechanisms modified to provide positive feedback so as to counterbalance a centering bias force. Two such suitable circuits are shown in FIGS. 8 and 9, but the invention is not to be limited thereto. FIG. 8 is a modification of a circuit shown in U.S. Patent 3,128,429 which may be examined for further details. In general, shaft 108 carrying lens component 106 is connected within stabilizing housing 110 to a rotatable coil 112. A permanent magnet 114 is utilized to establish a unidirectional magnetic flux field between the pole pieces 116. Current is brought to and received from the movable coil 112 via leads 118 and 119. An alternating magnetic flux field is also provided across movable coil 112 by means of a coil 120, here shown diagrammatically as encircling the magnet 114, with said coil 120 being energized by appropriate high frequency current. It will be apparent, therefore, that movable coil 112 rotates in a magnetic flux gap that includes the steady flux field of permanent magnet 114 and the alternating flux field produced by coil 120.

When the movable coil 112 is in its normal center position, as shown in the drawings, the A.C. field flux linkage is zero. The shaft 108 is mechanically biased to this center position by a pair of coiled springs 122 and 124 connected between the camera housing and an attachment bar 126. However, any deflection of movable coil 112 causes it to link proportionally the A.C. component of the flux field. An A.C. potential is thereby induced therein, such potential having a magnitude and phase proportional to the degree and direction of coil deflection. Thus, deflection of coil 112, in response to rotation of camera housing 104 and initial lack of movement of shaft 108 due to inertia of the shaft and of lens element 106 will result in induction of an A.C. voltage in movable coil 112 which can be amplified. This A.C. voltage is fed to wires 118 and 119 via a blocking capacitor 128 to an amplifier 130. The high frequency component of the voltage developed in the coil 112 is amplified by amplifier 130 and phase rectified by the frequency discriminator 132. The output of the frequency discriminator 132 is a D.C. current of magnitude proportional to the angular displacement of coil 112 from its center position, and of polarity determined by the direction of angular rotation. This current from frequency discriminator 132 is fed back to coil 112 and reacts with the permanent D.C. flux field of magnet 114 so as to oppose the mechanical restoring force set up by springs 124 and 122. Therefore, the angular rotation of coil 112 with respect to the pole faces is maintained so as to stabilize shaft 108 in space and prevent its turning with the camera housing.

A very similar circuit is shown in FIG. 9. A D'Arsonval movement with a movable coil 134 is suspended at its one side on shaft 108, and a primary or stator coil 136 is wound on the pole pieces 138, 140 of a permanent magnet 142. Stator winding 136 is excited by an A.C. source 144. The pole pieces 138, 140 are preferably of ferrite powered iron or the like to reduce A.C. losses. When the plane of coil 134 is exactly parallel to the A.C. and D.C. fields between pole pieces 138 and 140, no voltage will be induced in said coil. However, when the coil is inclined in the field, A.C. voltage will be induced therein proportional to the sign of the angle inclination. The phase of the induced A.C. voltage will reverse with the sign of the angle. This A.C. output is amplified in element 145 and then demodulated in a synchronous demodulator 146 also supplied with the A.C. voltage from oscillator 144. The resulting D.C. output from modulator 146 is fed through a typical electronic stabilization network and from there to D.C. amplifier 150. Amplifier 150 generates a D.C. current reapplied back to coil 134 which has a magnitude and polarity for exactly counterbalancing the restoring mechanical force on shaft 108 in order to maintain coil 134 in its angular position away from its center location. The A.C. and D.C. signals in coil 108 are kept separate by means of capacitor 152 and inductance 154.

While various embodiments of the invention have been shown and/or described, it is obvious that many modifications and changes thereto may be made by persons skilled in the art without departure from the novel principles defined in the appended claims.

The embodiments of the invention in which an exclusive property or privilege is claimed are defined as follows.

I claim:
1. Optical stabilization apparatus comprising:
 (a) first optical means situated in a path of radiation and subject to movement in at least a first direction in space;
 (b) second optical means situated in the path of radiation and relatively movable with respect to said first optical means in at least a second direction opposite to said first direction and away from a location fixed with respect to said first optical means;
 (c) biasing means responsive to the positioning of said second optical means away from said fixed location for applying a first force on said second optical means tending to return it to said fixed location; and
 (d) electrical means responsive to the positioning of said second optical means away from said fixed location for applying a second force on said second optical means in opposition to said first force so as to maintain said second optical means substantially fixed in space for movement of said first optical means in said first direction.

2. Apparatus according to claim 1 wherein said electrical means includes a force balance transducer with positive feedback.

3. Apparatus according to claim 1 wherein said first and second optical means together comprise an optical system adapted for preventing any substantial change in recorded image characteristics in a camera due to inadvertent movement of the camera.

4. Apparatus according to claim 1 wherein said second optical means is relatively movable in rectilinear fashion.

5. Apparatus according to claim 1 wherein said second optical means is relatively movable in angular fashion.

6. Optical stabilizing apparatus comprising:
 (a) first optical means situated in a path of radiation and subject to movement in at least a first direction in space;
 (b) second optical means situated in the path of radiation and relatively movable with respect to said first optical means in at least a second direction opposite to said first direction and away from a location fixed with respect to said first optical means;
 (c) first means responsive to the positioning of said second optical means away from said fixed location for applying a first force on said second optical means tending to return it to said fixed location;
 (d) first electrical sensing means connected with said first optical means for movement therewith;
 (e) second electrical sensing means connected with said second optical means for movement therewith, where said first and second electrical sensing means electrically coact to generate an electrical indication representative of the positioning of said second optical means away from said fixed location; and
 (f) second means responsive to said electrical indication for applying a second force on said second optical means in opposition to said first force so as to maintain said second optical means substantially fixed in space for movement of said first optical means in said first direction.

7. Apparatus according to claim 6 wherein said first and second optical means together comprise an optical system adapted for preventing any substantial change in recorded image characteristics in a camera due to inadvertent movement of the camera.

8. Apparatus according to claim 6 wherein said second optical means is relatively movable in rectilinear fashion.

9. Apparatus according to claim 6 wherein said second optical means is relatively movable in angular fashion.

10. Apparatus according to claim 6 wherein said first electrical sensing means includes two fixed spaced apart coils and said second electrical sensing means includes a single movable coil therebetween of a force balance transducer.

11. Optical stabilizing apparatus comprising:
  (a) first optical means situated in a path of radiation and subject to movement in at least either of two opposite directions about a first location fixed in space;
  (b) second optical means situated in the path of radiation and relatively movable with respect to said first optical means in at least either of said two opposite directions about a second location fixed with respect to said first optical means;
  (c) biasing means responsive to the positioning of said second optical means away from said second location for applying a first force on said second optical means tending to return to said second location; and
  (d) electrical means responsive to the positioning of said second optical means away from said second location for applying a second force on said second optical means in opposition to said first force so as to maintain said second optical means substantially fixed in space for movement of said first optical means in either of said two opposite directions.

12. Apparatus according to claim 11 wherein said electrical means includes a force balance transducer with positive feedback.

13. Apparatus according to claim 11 wherein said first and second optical means together comprise an optical system adapted for preventing any substantial change in recorded image characteristics in a camera due to inadvertent movement of the camera.

14. Apparatus according to claim 11 wherein said second optical means is relatively movable in rectilinear fashion.

15. Apparatus according to claim 11 wherein said second optical means is relatively movable in angular fashion.

16. Optical stabilizing apparatus comprising:
  (a) first optical means situated in a path of radiation and subject to movement in at least either of two opposite directions about a first location fixed in space;
  (b) second optical means situated in the path of radiation and relatively movable with respect to said first optical means in at least either of said two opposite directions about a second location fixed with reference to said first optical means;
  (c) first means responsive to the positioning of said second optical means away from said second location for applying a first force on said second optical means tending to return to said second location;
  (d) first electrical sensing means connected with said first optical means for movement therewith;
  (e) second electrical sensing means connected with said second optical means for movement therewith, where said first and second electrical sensing means electrically coact to generate an electrical indication representative of the positioning of said second optical means away from said second location; and
  (f) second means responsive to said electrical indication for applying a second force on said second optical means in opposition to said first force so as to maintain said second optical means substantially fixed in space for movement of said first optical means in either of said two directions.

17. Apparatus according to claim 16 wherein said first electrical sensing means includes two fixed spaced apart coils and said second electrical sensing means includes a single movable coil therebetween of a force balance transducer.

18. Apparatus comprising:
  (a) force balance transducer construction having first electrical coil means and second electrical coil means relatively movable therewith which electrically coact to generate an electrical error signal for any positioning of said second coil means away from a location fixed with respect to said first coil means;
  (b) first means biasing said second coil means at said fixed location;
  (c) second means responsive to said electrical error signal for applying an electrical force on said second coil means to oppose and counterbalance said first bias means so as to maintain said second coil means at a position away from said fixed location; and
  (d) first optical means attached to said first coil means and second optical means attached to said second coil means, said first and second optical means being situated in the same path of radiation.

No references cited.

JOHN M. HORAN, Primary Examiner